United States Patent
May

(10) Patent No.: US 6,364,254 B1
(45) Date of Patent: Apr. 2, 2002

(54) AIRCRAFT AIRFOIL WITH CLOSE-MOUNTED ENGINE AND LEADING EDGE HIGH LIFT SYSTEM

(75) Inventor: Peter May, Bremen (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/523,421

(22) Filed: Mar. 10, 2000

(30) Foreign Application Priority Data

Mar. 10, 1999 (DE) .......................................... 199 10 551

(51) Int. Cl.$^7$ .................................................. B64C 9/22
(52) U.S. Cl. ......................................... 244/214; 244/30
(58) Field of Search .............................. 244/213, 214, 244/215, 130, 201, 54

(56) References Cited

U.S. PATENT DOCUMENTS

| | | | |
|---|---|---|---|
| 3,218,005 A | * 11/1965 | Calderon | 244/54 |
| 3,556,439 A | 1/1971 | Autry et al. | 244/210 |
| 3,831,886 A | 8/1974 | Burdges et al. | 244/207 |
| 3,968,946 A | 7/1976 | Cole | 244/214 |
| 4,314,681 A | 2/1982 | Kutney | 244/54 |
| 4,384,693 A | 5/1983 | Pauly et al. | 244/207 |
| 4,427,168 A | 1/1984 | McKinney et al. | 244/130 |
| 4,489,905 A | * 12/1984 | Bengelink et al. | 244/130 |
| 4,540,143 A | 9/1985 | Wang et al. | 244/54 |
| 4,637,573 A | 1/1987 | Perin et al. | 244/54 |
| 4,643,376 A | * 2/1987 | Vanderhoeven | 244/198 |
| 4,702,441 A | 10/1987 | Wang | 244/204 |
| 4,884,772 A | * 12/1989 | Kraft | 244/199 |
| 4,993,663 A | * 2/1991 | Lahti et al. | 244/53 B |
| 5,056,741 A | 10/1991 | Bliesner et al. | 244/214 |
| 5,474,265 A | 12/1995 | Capbern et al. | 244/219 |
| 5,653,406 A | * 8/1997 | Amano et al. | 244/130 |

FOREIGN PATENT DOCUMENTS

| | | |
|---|---|---|
| DE | 19743907 | 12/1998 |
| FR | 2555960 | 6/1985 |
| JP | 53-98699 | 8/1978 |

OTHER PUBLICATIONS

"Leading Edge Devices", pp. 113–120, Aerodynamics, Aeronautics, and Flight Mechanics, Barnes W. McCormick, John Wiley Publishers (1979).

* cited by examiner

*Primary Examiner*—Galen L. Barefoot
(74) *Attorney, Agent, or Firm*—W. F. FGasse; W. G. Fasse

(57) ABSTRACT

An arrangement of an airfoil, such as a main wing of an aircraft, includes a close-mounted engine on a short pylon connected to the airfoil, an inboard slat arranged inboard from the engine pylon along the leading edge of the airfoil, and an auxiliary high lift device. An open cut-out space is formed between the outboard edge of the inboard slat, the engine pylon, and the leading edge of the airfoil when the inboard slat is extended. The auxiliary high lift device is configured and arranged to be extendable into an extended position in which it aerodynamically covers or closes the cut-out space. The auxiliary high lift device is a movable high lift component that can be retracted into a retracted position in which it is recessed and integrated into the outer contour of the engine nacelle and/or the pylon. Thereby, the structural arrangement and mechanisms necessary for extending and retracting the auxiliary high lift device are simplified, and the weight and costs are reduced.

14 Claims, 3 Drawing Sheets

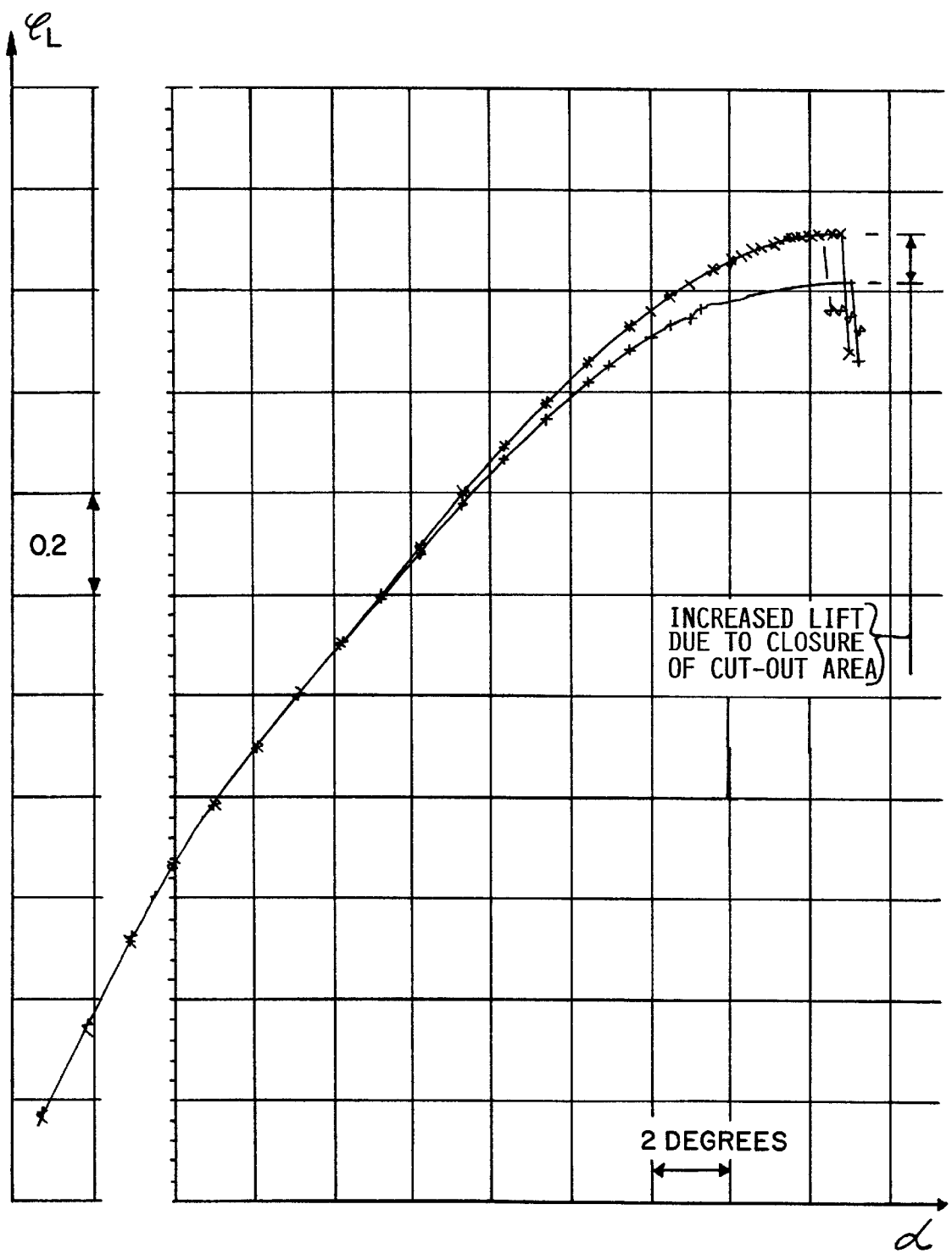
FIG.3  +— CUT OUT
X— SEPARATE KRUEGER FLAP
↲——— NACELLE DOOR

AIRCRAFT AIRFOIL WITH CLOSE-MOUNTED ENGINE AND LEADING EDGE HIGH LIFT SYSTEM

PRIORITY CLAIM

This application is based on and claims the priority under 35 U.S.C. §119 of 199 10 551.0, filed on Mar. 10, 1999, the entire disclosure of which is incorporated herein by reference.

FIELD OF THE INVENTION

The invention relates to an aircraft airfoil or lifting wing including at least one short-coupled or close-mounted engine, i.e. an engine mounted close to the wing on a short pylon, and including a high lift system provided at the leading edge of the airfoil. Particularly, the invention relates to a flap-like auxiliary high lift device adapted to be extended into an open space or gap in front of the leading edge of the airfoil, between the engine pylon, the outer lateral edge of a leading edge flap arranged on the inboard side of the pylon, and the portion of the airfoil leading edge nose extending between the pylon and the inboard leading edge flap. In this regard, and throughout this application, the extendable leading edge flap of the high lift system may be a slat, a Krueger device, a deflectable or bent nose device, or the like, for example.

BACKGROUND INFORMATION

Conventional aircraft typically use leading edge high lift devices to provide auxiliary lift in certain configurations and under certain flight attitudes. These leading edge high lift devices are aerodynamically effective movable components on the leading edge of the airfoil, such as slats, Krueger flaps, or the like, for example. The use of such leading edge high lift devices causes problems, however, at the areas where the engines are connected to the airfoil or wing. Namely, the size and position of the engine nacelle in relation to the airfoil limits either the size, the span-wise extension, and/or the adjustment and movement possibilities of such components. For example, if a prescribed depth of the leading edge high lift devices and a prescribed deflection angle are to be achieved for a landing configuration, then it is typically necessary to reduce the spanwise extension or length of the high lift devices, to prevent a collision between these devices and the engine nacelle or the engine pylon.

As a result of the above considerations, a portion of the airfoil leading edge cannot be used for increasing the lift. Namely, the above mentioned open space or gap between the side of the engine nacelle or pylon, the facing edge of the adjacent leading edge slat or other high lift device, and the leading edge of the airfoil extending therebetween, causes aerodynamic losses because the airflow through this open space or gap is not influenced in the desired manner by the leading edge high lift device. To address this problem, various complicated detail solutions have been provided, for example as follows.

One known system has been disclosed in German Patent 197 43 907, which issued Dec. 10, 1998 to the same assignee as the present application. That known system according to German Patent 197 43 907 involves an auxiliary device in the form of an additional, separately controllable and movable leading edge flap or slat device that can be slidingly or tiltingly extended out of the wing contour into the above mentioned open space or gap. While such an auxiliary device is very effective in closing the gap, or particularly achieving improved aerodynamic conditions in the area of the gap, it has been found to require relatively substantial efforts with regard to the mechanics that are necessary for realizing such a leading edge auxiliary device arrangement. Thus, it is considered that a simplification of such a device or system would be desirable.

Another attempted solution of the above discussed problems is the provision of a leading edge auxiliary lift device that extends completely along the entire span width of the airfoil, with a clearance opening or so-called "notch" provided to create a free clearance space between the pylon contour and the engine contour. In this context, the free clearance space of the span-wise extending auxiliary flap part, for example the span-wise end part of a leading edge slat extended on the inner side of the engine pylon, must be adapted to accommodate the greatest deflection or extension of the flap part, i.e. the landing configuration. For this reason, accordingly, the effectiveness of such an auxiliary lift system is disadvantageously reduced with smaller deflections, for example in a take-off configuration.

U.S. Pat. No. 4,540,143 (Wang et al.) discloses an engine-wing arrangement in which the nacelle of the engine comprises air flow guide surfaces on its outer contour. These guide surfaces serve to influence a turbulent air flow that is generated at the upper front nose or leading edge of the nacelle and then flows over the upper surface of the airfoil.

SUMMARY OF THE INVENTION

In view of the above it is an object of the invention to provide an arrangement of the above described general type, that is improved in such a manner so as to achieve a substantial reduction of the construction effort and complexity, the weight, and the construction costs of such a system in comparison to the previously proposed arrangements. The invention further aims to avoid or overcome the disadvantages of the prior art, and to achieve additional advantages, as are apparent from the present specification.

The above objects have been achieved in an airfoil arrangement according to the invention including an airfoil, an engine, a pylon connecting the engine to the airfoil, a leading edge high lift device movably connected to the airfoil at a leading edge thereof, and an auxiliary high lift device. An open space is formed between the leading edge of the airfoil, the pylon, and a side edge of the leading edge high lift device facing the pylon. The auxiliary high lift device is movable so that it can be extended into an extended position in which the auxiliary high lift device is positioned in the open space between the pylon, the airfoil leading edge, and the side edge of the leading edge high lift device. Particularly according the invention, the auxiliary high lift device is embodied as a movable flap-like component or "nacelle door" which can be retracted into a retracted position in which it is recessed and integrated into the outer contour of the engine nacelle and/or the pylon. Preferably, the auxiliary high lift device is also movably, mechanically connected to the engine nacelle and/or the pylon so as to be extendable therefrom. In the extended position, the auxiliary high lift device aerodynamically closes or covers the open space or gap. Preferably, the auxiliary high lift device is profiled or contoured in such a manner so that the maximum lift and the critical angle of attack of the airfoil are increased.

BRIEF DESCRIPTION OF THE DRAWINGS

In order that the invention may be clearly understood, it will now be described in connection with example embodiments, with reference to the accompanying drawings, wherein:

FIG. 3 is a graph of measurement data showing the coefficient of lift as a function of the angle of attack for different airfoil arrangements.

DETAILED DESCRIPTION OF PREFERRED EXAMPLE EMBODIMENTS AND OF THE BEST MODE OF THE INVENTION

Figure 1:
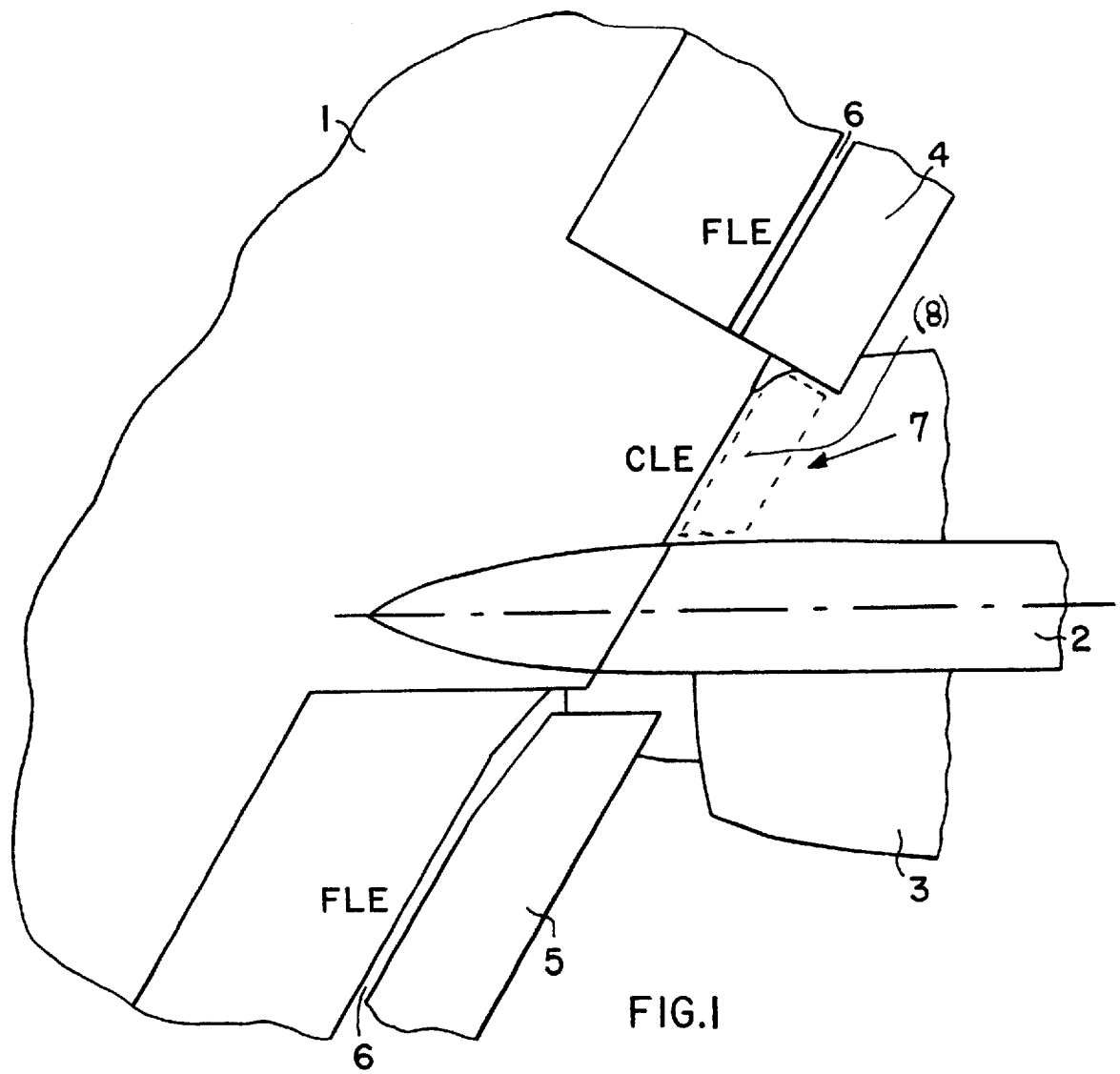
FIG. 1 is a schematic top plan view of a portion of an aircraft airfoil including an engine connected by a pylon to the airfoil, for demonstrating the open space or gap also known as the "cut-out space" between the pylon, the airfoil leading edge, and a side edge of a leading edge slat.

FIG. 1 shows a portion of the right wing or main lifting airfoil 1 of an aircraft, to which an engine 3 including an engine nacelle is connected by means of an engine pylon 2. While the aircraft fuselage itself is not shown in the drawings, it is understood that the aircraft fuselage is generally at the top of FIGS. 1 and 2, i.e. the inboard root end of the wing 1 is in the direction of the top of FIGS. 1 and 2. An inboard leading edge slat 4 is arranged at the leading edge of the airfoil 1 on the inboard side relative to the engine 3, while an outboard leading edge slat 5 is arranged at the leading edge of the airfoil 1 on the outboard side with respect to the engine 3. In the illustrated example embodiment, the inboard and outboard slats 4 and 5 are true slats arranged so as to form a gap 6 between the fixed leading edge FLE of the wing and the trailing edge TE of the respective slats 4 and 5 when the slats 4 and 5 are in the extended position as illustrated. Nonetheless, the slats 4 and 5 could be replaced by any other conventional leading edge high lift devices other than slats.

The airflow passing through the gaps 6 between the airfoil 1 and the slats 4 and is a strongly accelerated airflow which flows over the upper surface of the airfoil 1 and has the effect of reducing the thickness of the boundary layer on the upper surface of the airfoil 1. This in turn substantially increases the maximum possible angle of attack without inducing flow separation or stall conditions, and thereby also correspondingly increases the maximum lift that can be generated by the airfoil 1.

While the outboard slat 5 can be extended without colliding into the nacelle of the engine 3 or the pylon 2, and while extending practically directly adjacent to the pylon 2, this is not possible for the inboard slat 4. Namely, in order to avoid a collision between the inboard slat 4 and the pylon 2 or the nacelle of the engine 3, the maximum span-wise length and the maximum extended position of the inboard slat 4 are limited, which gives rise to an open space or gap, namely a so-called cut-out space 7 between the pylon 2 and the adjacent or facing side edge of the inboard slat 4. This cut-out space 7 is defined or bounded between the inboard-facing side of the pylon 2, the outboard-facing side edge of the inboard slat 4, and the portion of the clean leading edge nose CLE of the airfoil 1 extending between the pylon 2 and the slat 4.

Figure 2:
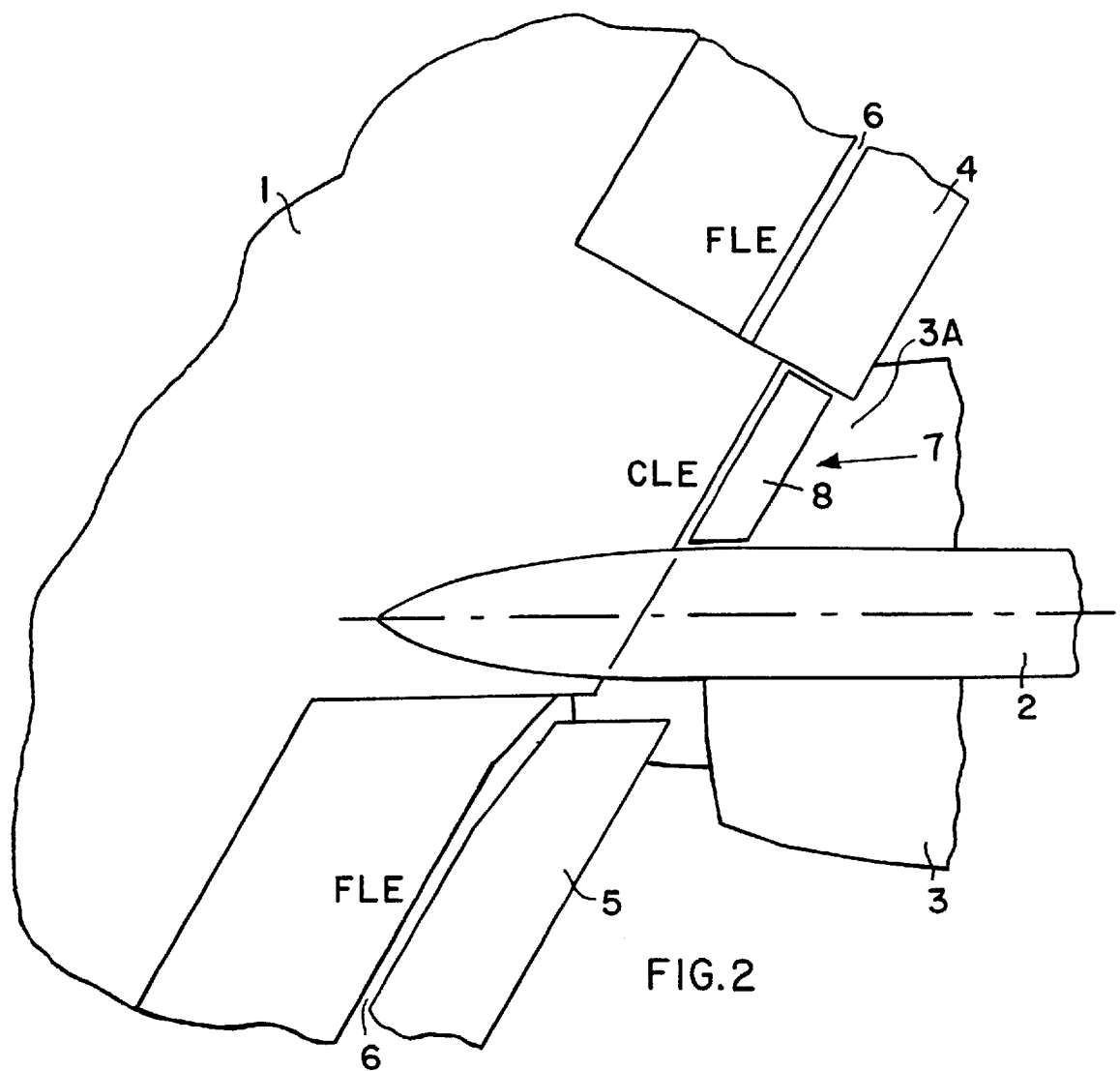
FIG. 2 is a schematic top plan view similar to FIG. 1, but showing a flap-like auxiliary high lift device according to the invention extended into the cut-out space so as to aerodynamically close this space.

FIG. 2 shows the same arrangement as FIG. 1, but with an auxiliary high lift device 8 according to the invention deployed or extended to aerodynamically close or cover the cut-out space 7. The auxiliary high lift device 8 according to the invention is embodied as a flap-like high lift element that is movable between a retracted position and an extended position. In the retracted position (shown representatively by dashed lines in FIG. 1), the auxiliary high lift device 8 is retracted, recessed, and integrated into the outer contour 3A of the nacelle of the engine 3 and/or in the pylon 2. To achieve this, the nacelle of the engine 3 and/or the pylon 2 has a recess therein, adapted to receive the auxiliary high lift device 8 (and preferably also its operating mechanism) retracted thereinto, so that the outer surface of the auxiliary high lift device 8 is flush with the outer contour 3A of the nacelle and/or the pylon. In the extended position, the auxiliary high lift device 8 is extended from the nacelle and/or the pylon to be positioned to aerodynamically close the cut-out space 7 as described above.

The auxiliary high lift device 8 is preferably connected to and operatively driven relative to the pylon and/or the engine nacelle by any known mechanical means such as linkages, rollers, tracks, lever arms, screw jacks, hydraulic piston assemblies, and the like, so as to be extendable from and retractable into the nacelle of the engine 3 and/or the pylon 2. Namely, the auxiliary high lift device 8 may be directly mechanically connected to the nacelle of the engine 3 and/or to the pylon 2. Alternatively, the auxiliary high lift device 8 may be directly mechanically connected to the airfoil 1 itself. In any event, in the retracted position, the auxiliary high lift device is flushly received and integrated into the outer contour of the nacelle of the engine 3 and/or the pylon 2. Particularly, the auxiliary high lift device 8 can be configured or embodied as a nacelle door that can be retracted flushly into the outer contour of the nacelle, or can be deployed to aerodynamically close the cut-out 7.

Advantageously, the auxiliary high lift device 8 is preferably contoured in such a manner so that it increases the maximum attainable lift and the critical angle of attack of the airfoil 1. In this regard, the critical angle of attack is the magnitude of the angle of attack or incidence angle of the airfoil 1 at which an airflow separation begins to occur and correspondingly results in a reduction of the lift. The auxiliary high lift device 8 extended into the open cut-out space 7 helps to prevent or delay the onset of flow separation and thereby increases the critical angle of attack and the maximum lift. The graphical representation of FIG. 3 shows the achieved coefficient of lift $C_L$ relative to various angles of attack a. Particularly, the graph of FIG. 3 shows the coefficients of lift achieved for three different arrangements, namely an airfoil arrangement with a cut-out space but no auxiliary high lift device (shown by "+" symbols in the graph), an airfoil arrangement with a separate Krueger flap (shown by "x" symbols in the graph), and the present inventive arrangement using an auxiliary high lift device configured as a nacelle door that is extended to aerodynamically cover the cut-out space (indicated by "✦" symbols in the graph). The data curves plotted in FIG. 3 show a considerable increase of the generated lift for angles of attack greater than 10°.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An airfoil arrangement comprising:
    an airfoil;
    an engine including an engine nacelle;
    a pylon connecting said engine to said airfoil;
    a high lift leading edge flap movably connected to said airfoil so as to be extendable into an extended flap position and retractable into a retracted flap position relative to said airfoil, wherein an open space and a corresponding aerodynamic gap is formed between a leading edge portion of said airfoil, said pylon and a side edge of said leading edge flap facing said pylon, when said leading edge flap is in said extended flap position; and an auxiliary high lift device that is movably arranged so as to be extendable into an extended device position and retractable into a retracted device position, wherein said auxiliary high lift device in said extended device position is positioned in said open space to cooperate with said leading edge flap in said extended flap position and to at least partly close said aerodynamic gap, and wherein said auxiliary high lift device in said retracted device position is integrated into an outer contour of at least one of said nacelle and said pylon.

2. The airfoil arrangement according to claim 1, wherein said leading edge flap is an inboard leading edge flap arranged between said pylon and a root end of said airfoil adapted to be connected to an aircraft fuselage, and said side edge of said leading edge flap is an outwardly facing side edge of said leading edge flap that faces away from said root end of said airfoil.

3. The airfoil arrangement according to claim 1, wherein said auxiliary high lift device comprises an aerodynamically contoured auxiliary flap that aerodynamically closes said open space when said auxiliary flap is in said extended device position.

4. The airfoil arrangement according to claim 1, wherein said high lift leading edge flap is a leading edge slat.

5. The airfoil arrangement according to claim 1, wherein said high lift leading edge flap is a Krueger device.

6. The airfoil arrangement according to claim 1, wherein said high lift leading edge flap is a bent nose or drooped nose device.

7. The airfoil arrangement according to claim 1, wherein said auxiliary high lift device is configured and arranged in said extended device position so as to respectively increase a maximum lift and a critical angle of attack of a portion of said airfoil located flow downstream from said auxiliary high lift device.

8. The airfoil arrangement according to claim 1, wherein said pylon is a short pylon connecting said engine to said airfoil in a close-mounted engine configuration.

9. The airfoil arrangement according to claim 1, wherein said auxiliary high lift device is movably mechanically connected directly to said pylon, said pylon has a recess therein, and said auxiliary high lift device is received flushly in said recess in said retracted device position.

10. The airfoil arrangement according to claim 1, wherein said auxiliary high lift device is movably mechanically connected directly to said engine nacelle, said engine nacelle has a recess therein, and said auxiliary high lift device is received flushly in said recess in said retracted device position.

11. The airfoil arrangement according to claim 1, wherein said auxiliary high lift device comprises an auxiliary slat having a trapezoidal top view plan shape.

12. The airfoil arrangement according to claim 1, wherein said auxiliary high lift device comprises an auxiliary flap having a trapezoidal top view plan shape.

13. The airfoil arrangement according to claim 1, wherein said auxiliary high lift device comprises a nacelle flap door that is pivotably connected to said nacelle, that can be selectively pivoted down flushly into said outer contour of said nacelle in said retracted device position, and that can be selectively pivoted up from said nacelle to at least partially aerodynamically close said aerodynamic gap in said extended device position.

14. The airfoil arrangement according to claim 1, wherein said auxiliary high lift device in said extended device position forms, in said aerodynamic gap, an aerodynamically effective extension of said leading edge flap in said extended flap position.

* * * * *

UNITED STATES PATENT AND TRADEMARK OFFICE
CERTIFICATE OF CORRECTION

PATENT NO.    : 6,364,254 B1
DATED         : April 2, 2002
INVENTOR(S)   : May

It is certified that error appears in the above-identified patent and that said Letters Patent is hereby corrected as shown below:

<u>Title page,</u>
Item [74], *Attorney, Agent or Firm*, replace "W.F. Fgasse" by -- W.F. Fasse --.

<u>Column 4,</u>
Line 42, after "attack", replace "a" by -- $\alpha$ --.

Signed and Sealed this

Eleventh Day of June, 2002

Attest:

JAMES E. ROGAN
*Attesting Officer*     *Director of the United States Patent and Trademark Office*